UNITED STATES PATENT OFFICE.

HUGO SCHWEITZER, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

1,024,031.   Specification of Letters Patent.   Patented Apr. 23, 1912.

No Drawing.   Application filed December 30, 1911. Serial No. 668,582.

*To all whom it may concern:*

Be it known that we, HUGO SCHWEITZER and ARTHUR ZART, doctors of philosophy, chemists, citizens of the German Empire, residing, respectively, at Elberfeld and Vohwinkel, near Elberfeld, Germany, have invented new and useful Improvements in Azo Dye, of which the following is a specification.

The present invention relates to the manufacture and production of new azo dyestuffs capable of dyeing unmordanted cotton in from yellow to orange shades which on being developed on the fiber become fast to washing.

The process for their production consists in converting into urea compounds sulfonic acids of nitro- or acidyl-amino-arylacidyl derivatives of diaminoazo compounds in which the two amino groups are contained in different nuclei and in subsequently reducing the nitro products obtained from the nitroaminoazo compounds or in saponifying the acidylated products. For the production of the acidylamino-arylacidyl-diamino-azo compounds a diaminoaryl-sulfonic acid is condensed with an acidyl-amino or nitro-aryl-acidyl-chlorid, the free amino group is diazotized and the diazo compound is combined with a suitable aromatic amin. The urea compounds are produced in the usual way by treatment with phosgen. The new dyes are after being dried and pulverized in the shape of their alkaline salts dark yellow powders soluble in water with a yellow color and soluble in concentrated sulfuric acid with a reddish to violet color. Upon reduction with stannous chlorid and hydrochloric acid an aminoaryl-acidyl-diamino-sulfonic acid and an urea of a diamin is obtained, which is split up into carbonic acid and a diamin.

In order to illustrate the new process more fully the following example is given, the parts being by weight:—401 parts of meta-sulfaminobenzoyl-2.6-toluylenediamin-4-sulfonic acid (obtainable by reducing meta-nitrobenzoyl-2.6-toluylenediamin-4-sulfonic acid with bisulfite) are diazotized and combined with 137 parts of cresidin. The monoazo dye is after solution in aqueous sodium carbonate converted into the urea compound by treatment with phosgen, then the solution is rendered acid with hydrochloric acid and boiled till all the dyestuff is precipitated to eliminate the sulfonic acid radical attached to the amino group. The dyestuff is then filtered off. It is after being dried and pulverized in the shape of its sodium salt a dark yellow powder soluble in water with a yellow color and soluble in concentrated sulfuric acid with a violet color; yielding upon reduction with stannous chlorid and hydrochloric acid meta-aminobenzoyl-2-toluylenediamin-4-sulfonic acid:

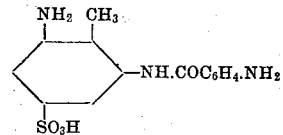

and the urea of aminocresidin:

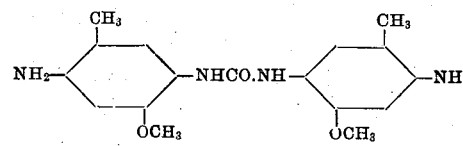

which is further decomposed into para-methoxy-ortho-meta-diaminotoluene and carbonic acid. It dyes cotton yellow yielding a pure yellow of good fastness to washing after combination with diazotized para-nitranilin. The shade thus produced can be well discharged.

Instead of meta-sulfaminobenzoyl-2.6-toluylenediamin-4-sulfonic acid the corresponding derivatives of the 1.3-phenylenediamin-4-sulfonic acid, 2.4-toluylenediamin-5-sulfonic acid, para-phenylenediamin-ortho-sulfonic acid may be used and instead of the sulfaminobenzoyl radical the sulfaminoanisoyl, the acetylaminobenzoyl radical, the sulfaminoaryl sulfonic acid radical ($SO_3H.NH.C_7H_7.SO_3$), or in all cases the corresponding nitroarylacidyldiamino-sulfonic acid e. g. the para-nitrophenylacetyl-2.6-toluylene-4-sulfonic acid:

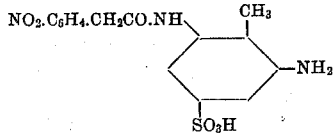

may be used, the nitro group then at last being reduced in the urea dyestuff.

As second component any other suitable amin can be used e. g. anilin, toluidins, xylidins, acidyldiamins, naphthylamins, etc.

We claim:—

1. The herein described new dyestuffs being ureas of sulfonic acids of aminoaryl-acidylaminoazo compounds containing free amino groups, which dyes are after being dried and pulverized in the shape of their alkaline salts dark yellow powders soluble in water with a yellow and soluble in concentrated sulfuric acid with a reddish to violet color; yielding upon reduction with stannous chlorid and hydrochloric acid an aminoaryl-acidyldiamino sulfonic acid and an urea of a diamin, which is further decomposed into carbonic acid and a diamin; dyeing cotton yellow to orange shades which on being developed on the fiber become fast to washing, substantially as described.

2. The herein described new dyestuff being the urea of the azo compound from meta-aminobenzoyl-2.6-toluylenediamin-4-sulfonic acid and cresidin of the formula:

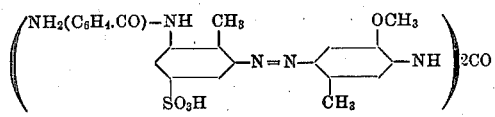

which is after being dried and pulverized in the shape of its sodium salt a dark yellow powder soluble in water with a yellow color and soluble in concentrated sulfuric acid with a violet color; yielding upon reduction with stannous chlorid and hydrochloric acid meta-aminobenzoyl-2.6-toluylenediamin-sulfonic acid and the urea of aminocresidin which is further decomposed into para-methoxy-ortho-meta-diamino-toluene and carbonic acid; dyeing cotton yellow shades fast to washing after combination with diazotized para-nitranilin, substantially as described.

In testimony whereof we have hereunto set our hands in the presence of two subscribing witnesses.

HUGO SCHWEITZER. [L. S.]
ARTHUR ZART. [L. S.]

Witnesses:
A. PEEFER,
CHAS. J. WRIGHT.